US008995647B2

(12) United States Patent
Li et al.

(10) Patent No.: US 8,995,647 B2
(45) Date of Patent: Mar. 31, 2015

(54) METHOD AND APPARATUS FOR ROUTING A CALL USING A HYBRID CALL ROUTING SCHEME WITH REAL-TIME AUTOMATIC ADJUSTMENT

(71) Applicant: Xerox Corporation, Norwalk, CT (US)

(72) Inventors: Faming Li, Solon, OH (US); Bo Hu, Pittsford, NY (US); Yu-An Sun, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 67 days.

(21) Appl. No.: 13/898,136

(22) Filed: May 20, 2013

(65) Prior Publication Data
US 2014/0341370 A1 Nov. 20, 2014

(51) Int. Cl.
*H04M 3/00* (2006.01)
*H04M 3/523* (2006.01)
(52) U.S. Cl.
CPC .................................. *H04M 3/5232* (2013.01)
USPC ............................... 379/265.11; 379/265.06
(58) Field of Classification Search
CPC ..... H04M 3/51; H04M 3/523; H04M 3/5232; H04M 3/5233; H04M 3/5238; H04M 2203/40; H04M 2203/401; H04M 2203/402; H04M 2203/407; H04M 2203/408
USPC ............. 379/265.01, 265.02, 265.05, 265.06, 379/265.11, 265.12, 265.13, 265.14, 379/266.01, 266.02, 266.03
See application file for complete search history.

(56) References Cited

U.S. PATENT DOCUMENTS

2005/0286705 A1* 12/2005 Contolini et al. ........ 379/265.02
2010/0086120 A1* 4/2010 Brussat et al. ........... 379/265.12

* cited by examiner

*Primary Examiner* — Antim Shah

(57) ABSTRACT

A method, non-transitory computer readable medium, and apparatus for routing a call using a hybrid call routing scheme are disclosed. For example, the method receives a call for a customer agent at a call center, identifies a list of available customer agents, calculates a hybrid score for each one of the available customer agents, wherein the hybrid score is based upon a combination of a longest-idle-agent routing parameter, a performance based routing parameter and a tuning parameter, selects a customer agent from the list of the available customer agents having a highest hybrid score and routes, by the processor, the call to the customer agent that is selected.

14 Claims, 4 Drawing Sheets

METHOD AND APPARATUS FOR ROUTING A CALL USING A HYBRID CALL ROUTING SCHEME WITH REAL-TIME AUTOMATIC ADJUSTMENT

The present disclosure relates generally to routing calls in a call center and, more particularly, to a method and an apparatus for routing a call using a hybrid call routing scheme with real-time automatic adjustment.

BACKGROUND

Previously, when an incoming call is received at a call center, the call is routed to the first available agent. This is typically done on a first in first out basis. In other words, the agent who has been free the longest time is assigned to service the next incoming call. However, even though this method is fair, it is also inefficient.

SUMMARY

According to aspects illustrated herein, there are provided a method, a non-transitory computer readable medium, and an apparatus for routing a call using a hybrid call routing scheme. One disclosed feature of the embodiments is a method that receives a call for a customer agent at a call center, identifies a list of available customer agents, calculates a hybrid score for each one of the available customer agents, wherein the hybrid score is based upon a combination of a longest-idle-agent routing parameter, a performance based routing parameter and a tuning parameter, selects a customer agent from the list of the available customer agents having a highest hybrid score and routes, by the processor, the call to the customer agent that is selected.

Another disclosed feature of the embodiments is a non-transitory computer-readable medium having stored thereon a plurality of instructions, the plurality of instructions including instructions which, when executed by a processor, cause the processor to perform operations that receive a call for a customer agent at a call center, identify a list of available customer agents, calculate a hybrid score for each one of the available customer agents, wherein the hybrid score is based upon a combination of a longest-idle-agent routing parameter, a performance based routing parameter and a tuning parameter, select a customer agent from the list of the available customer agents having a highest hybrid score and route, the call to the customer agent that is selected.

Another disclosed feature of the embodiments is an apparatus comprising a processor and a computer readable medium storing a plurality of instructions which, when executed by the processor, cause the processor to perform operations that receive a call for a customer agent at a call center, identify a list of available customer agents, calculate a hybrid score for each one of the available customer agents, wherein the hybrid score is based upon a combination of a longest-idle-agent routing parameter, a performance based routing parameter and a tuning parameter, select a customer agent from the list of the available customer agents having a highest hybrid score and route the call to the customer agent that is selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for routing a call using a hybrid call routing scheme. As discussed above, routing a call in call center based upon a longest free time of each available agent is inefficient. Alternatively, another call routing scheme can be deployed that uses performance based routing where an incoming call is forwarded to an idle agent with the highest performance ranking. Performance based routing can potentially increase the throughput and service level of the entire call center. While performance based routing promotes agents to compete for jobs, the performance based routing may also cause frustration among some agents due to unfair routing of calls. This leads to less opportunity for lower performing agents. As a result, many call center managers may hesitate to implement a pure performance based routing scheme. In other words, routing a call in a call center using only performance based routing may create frustration among some agents and a sense of unfairness as most calls tend to be routed to the same agents over and over again.

One embodiment of the present disclosure provides a method for routing a call using a hybrid call routing scheme. In one embodiment, the hybrid call routing scheme captures the efficiency of the performance based routing during a busy time and the fairness of the longest-idle-agent routing in a slower time without sacrificing the efficiency of the performance based routing. For example, in one embodiment the hybrid call routing scheme may be based on both the performance based routing and the longest idle agent routing. However, the hybrid call routing scheme of the present disclosure captures the benefit of fairness of the longest-idle-agent routing and the benefit of efficiency of the performance based routing without suffering from many of the drawbacks associated with both routing schemes.

In one embodiment, a tuning parameter may be used that may be automatically adjusted in real-time each time a new call is received at the call center that requires a customer agent. In one embodiment, the tuning parameter may balance an influence of the performance based routing or the influence of the longest idle agent routing in calculating the hybrid score for each available agent based upon whether or not the call center is busy (e.g., a level of a call waiting or hold queue). For example, during a busy time the efficiency may be more important and the tuning parameter may adjust the hybrid call routing scheme to be weighted more towards the performance based routing portion of the hybrid call routing scheme. During a less busy time the efficiency is less important and fairness may be achieved by adjusting the hybrid call routing scheme using the tuning parameter to be weighted more towards the longest-idle-agent routing portion of the hybrid call routing scheme.

Figure 1:
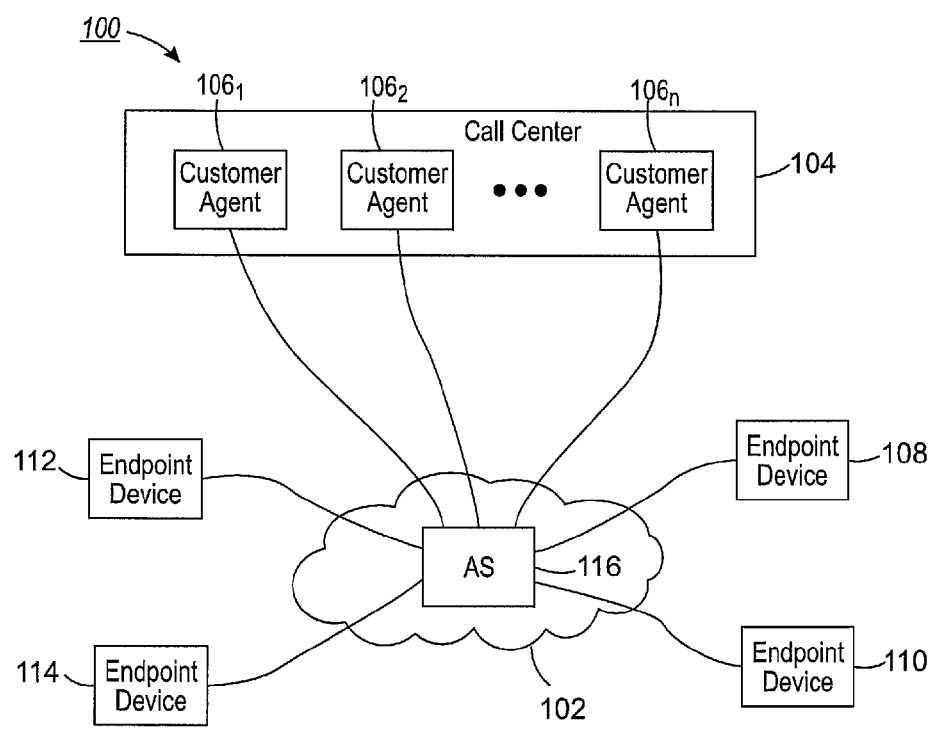
FIG. 1 illustrates one example of a communication network of the present disclosure.

To better understand the present disclosure, FIG. 1 illustrates an example of a communication network 100. In one embodiment, the communication network 100 may include a packet network such as an Internet Protocol (IP) network 102. The IP network 102 may be, for example, a cellular communication network, the Internet, a service provider network, an access network, a core network, and the like.

Figure 4:
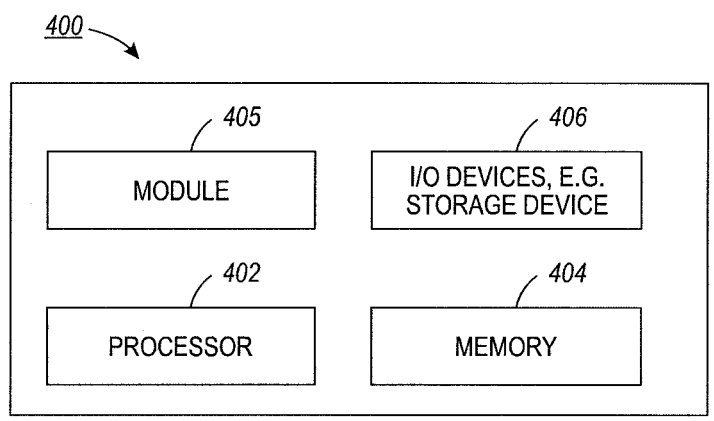
FIG. 4 illustrates a high-level block diagram of a general-purpose computer suitable for use in performing the functions described herein.

In one embodiment, the IP network 102 may include an application server (AS) 116. Although the AS 116 is illustrated as being in the IP network 102, it should be noted that the AS 116 may also be located at the call center 104. It should be noted that although only a single AS 116 is illustrated, any number of application servers may be deployed. The AS 116 may include a processor and a memory for storing information. In one embodiment, the AS 116 may be embodied as a general purpose computer as illustrated in FIG. 4 and discussed below.

In one embodiment, the AS 116 may manage and route calls coming in from an endpoint device 108, 110, 112 and/or 114 attempting to reach a customer agent $106_1$ to $106_n$ (also referred to collectively as customer agents 106) at a call center 104. In one embodiment, the AS 116 may perform a method for routing a call using a hybrid call routing scheme.

In one embodiment, the endpoint devices 108, 110, 112 and 114 may be any type of endpoint device capable of communicating with the IP network 102. For example, the endpoint devices 108, 110, 112 and 114 may be a telephone, a cellular telephone, a smartphone, a laptop computer with calling capability, a desktop computer with calling capability, a tablet computer with calling capability, and the like. It should be noted that although four endpoints are illustrated in FIG. 1, any number of endpoint devices (e.g., more or less) may be deployed.

It should be noted that the communication network 100 has been simplified. For example, the network 100 may include other network elements (not shown) such as border elements, routers, switches, policy servers, security devices, firewalls, a content distribution network (CDN), and the like. In addition, the communication network 100 may include additional networks (not shown) between the IP network 102, the mobile endpoint devices 108, 110, 112 and 114 and the call center 104, such as different access networks.

As noted above, the AS 116 may perform a method for routing a call using a hybrid call routing scheme. In one embodiment, the hybrid call routing scheme may be defined by the equation:

$$H_i = \mu P_i + (1-\mu)T_i, \quad \text{Eq. (1):}$$

where $H_i$ is a hybrid score of an ith customer agent of the available customer agents, $P_i$ is a performance based routing score of the ith customer agent of the available customer agents, $T_i$ is a waiting time of the ith customer agent of the available customer agents and $\mu$ is a tuning variable having a value between 0 to 1, wherein when a call waiting queue is empty, $\mu=0$ and when the call waiting queue is at a maximum capacity, $\mu=1$.

Figure 2:
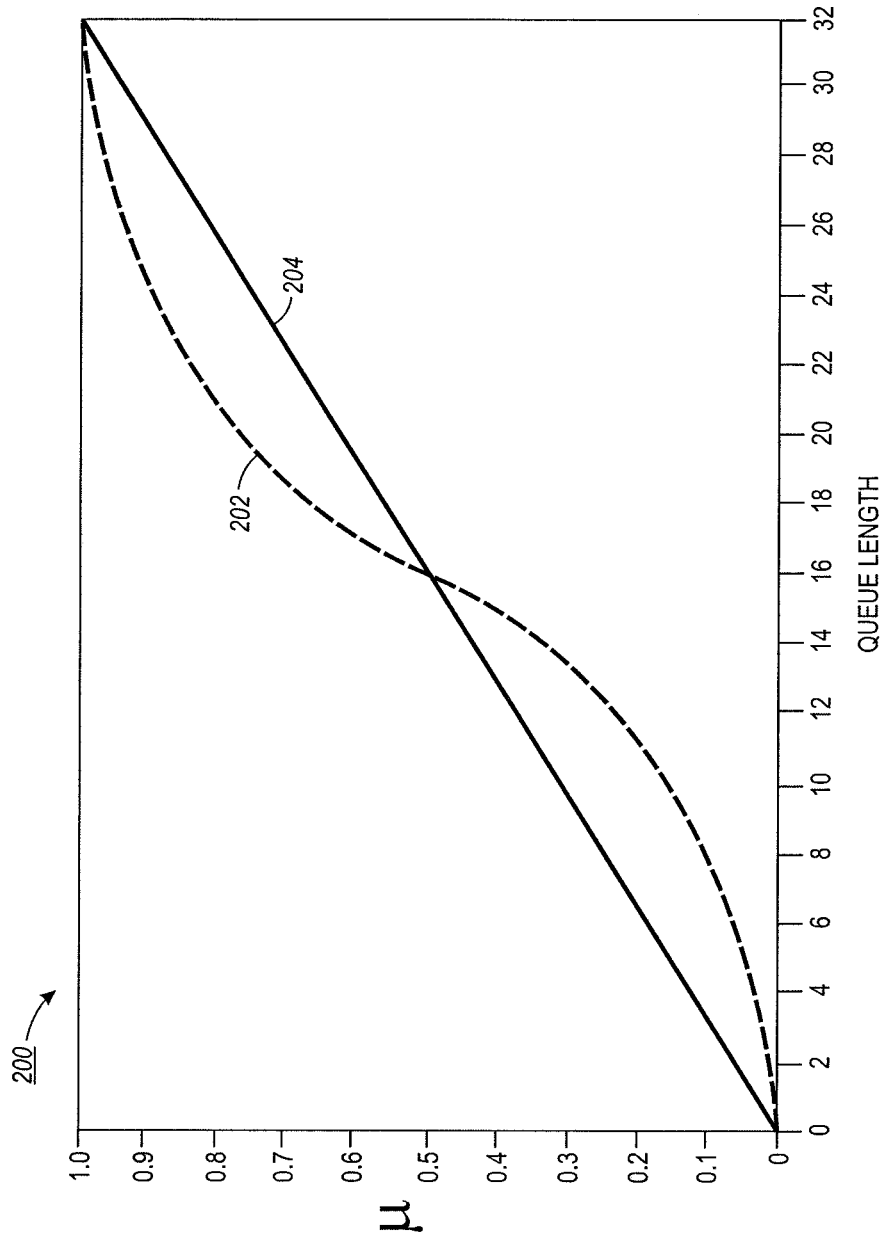
FIG. 2 illustrates an example of a tuning function chart.

FIG. 2 illustrates an example chart 200 that can be used to determine the value of $\mu$. In one embodiment, the chart 200 may be a relationship between the value of $\mu$ and the queue length (e.g., a number of calls that are in the queue waiting to be serviced by a customer agent 106). Although FIG. 2 illustrates the maximum queue length as being 32, it should be noted that the value and increments of the queue length for the chart 200 may vary depending on a size of the queue length of a particular call center 104. For example, the queue length may be smaller or larger than 32.

In one embodiment, the relationship between $\mu$ and the queue length may be logarithmic as illustrated by the line 202. In one embodiment, the relationship between $\mu$ and the queue length may be linear as illustrated by line 204.

In one embodiment, the lines 202 or 204 are drawn such that the value of $\mu$ is approximately equal to 0 when the queue length is empty or equal to 0, equal to 0.5 when the queue is half full and equal to 1 when the queue is full. In other words, when the queue is empty or the call center 104 is not very busy, Eq. (1) becomes a pure longest-idle-agent routing method. When the queue is full or the call center 104 is very busy, Eq. (1) becomes a pure performance based routing method. When the queue is between empty and full, Eq. (1) becomes a hybrid routing method that is weighted towards either the longest-idle-agent routing method or the performance based routing method depending on whether the queue is closer to full or empty. When the queue is half full, Eq. (1) becomes equally weighted toward the longest-idle-agent routing method and the performance based routing method.

In one embodiment, when a call is received to be routed to an available agent, the hybrid routing scheme or method balances fairness for the customer agents 106 to receive a call and efficiency in processing all the incoming calls in the queue. In one embodiment, when the call is received, the hybrid score can be calculated for each available agent by looking up the value of $\mu$ from the chart 200 based upon a number of calls waiting in the queue. The value of $\mu$ may be updated in real-time as new calls are received. As the number of calls in the queue change, the value of $\mu$ can change. Thereby, the hybrid score for each available agent 106 can be continuously updated as new calls are received at the call center 104.

In one embodiment, the performance based routing score $P_i$ may be calculated by any available performance based routing function. One example may be a performance score based on an average call duration. In one embodiment, the performance score $P_i$ may be calculated using the following equation:

$$P_i = 1/D_i, \quad \text{Eq. (2):}$$

where $D_i$ is an average call duration of an ith customer agent of the available customer agents.

Another example may be a performance scored based on a call duration and quality. In one embodiment, the performance score $P_i$ may be calculated using the following equation:

$$P_i = (\alpha * G_i)/D_i, \quad \text{Eq. (3):}$$

where $\alpha$ is a constant parameter which can be used to set a relative importance of the call quality versus the call duration, $G_i$ is a service quality grade of an ith customer agent of the available customer agents and $D_i$ is an average call duration of an ith customer agent of the available customer agents. In one embodiment, the value of $\alpha$ may set to any value by the call center 104 depending on how much more or less call quality should be weighted versus the call duration in calculating the performance score $P_i$.

Another example may be a performance score based on a number of calls handled per hour. In one embodiment, the performance score $P_i$ may be calculated using the following equation:

$$P_i = \Sigma C_i/T \quad \text{Eq. (4):}$$

where $C_i$ a total number of calls handled by the ith customer agent of the available customer agents from a time period of 0 to T and T is the time period (e.g., hours, minutes, and the like) for which the total number of calls are being summed.

Another example may be an adjusted performance score Ps(t), which depends on the performance measurement in the previous n periods, $P_{t-1}, P_{t-2}, \ldots P_{t-n}$. In addition, the periods may be weighted such that more recent performance measurement periods are weighted more heavily than older performance measurement periods. In one embodiment, the performance score $P_i$ may be a function of Ps(t) calculated using the following equation:

$$P_i = Ps(t) = W_{t-1}*P_{t-1} + W_{t-2}*P_{t-2} + \ldots W_{t-n}*P_{t-n} \qquad \text{Eq. (5):}$$

where W is a weighting factor for a time period t and P is a performance score of a time period t. The performance score P in equation 5 may be any performance score, for example one of the performance score methods described by equations (2)-(4).

Thus, by using the hybrid call routing scheme customer agents may not be unfairly treated by having most calls routed to the top performing customer agents in a pure performance based routing method. In addition, the performance of the hybrid call routing scheme is only slightly less efficient than a pure performance based routing method. For example, Table 1 illustrates the similar performance of the hybrid call routing scheme versus a pure longest-idle-agent routing method and a pure performance based routing method.

TABLE 1

COMPARISON OF SERVICE TIME AND WAIT TIME

|  | Longest-idle-agent routing | Performance based routing | Hybrid routing |
| --- | --- | --- | --- |
| Average Service Time (in sec) | 205 | 194 | 197 |
| Average Wait Time (in sec) | 456 | 235 | 244 |

Figure 3:
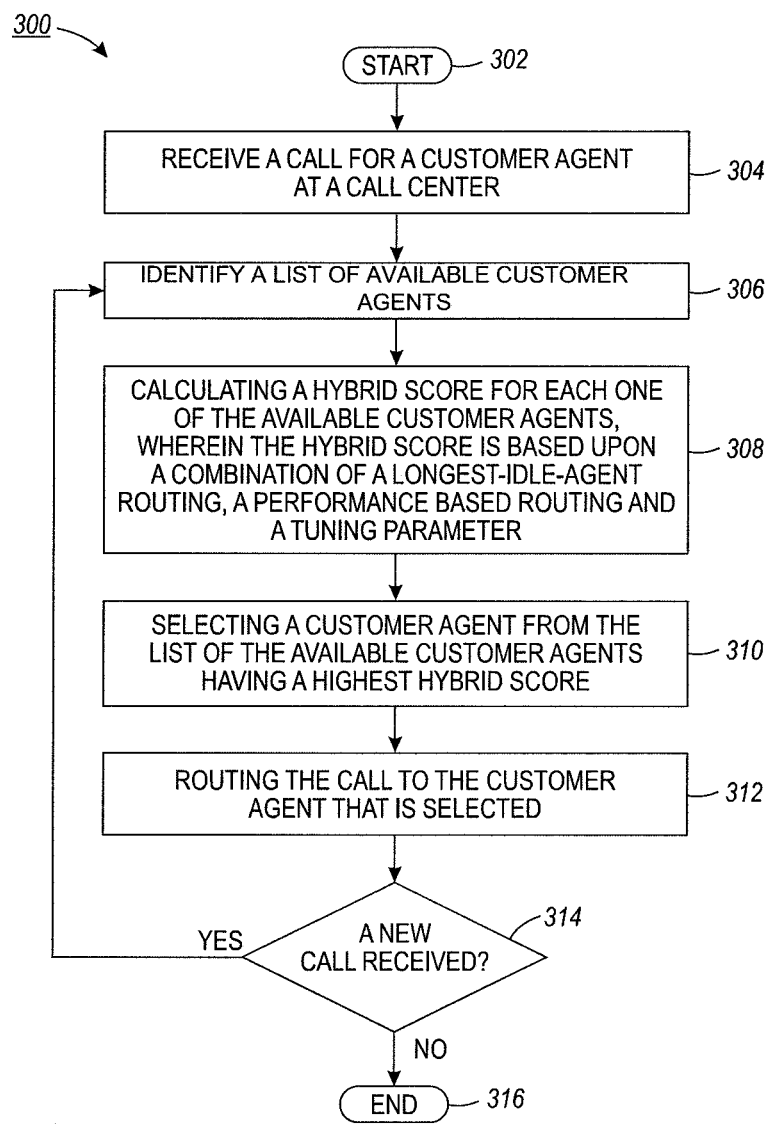
FIG. 3 illustrates an example flowchart of a method for routing a call using a hybrid call routing scheme.

FIG. 3 illustrates a flowchart of a method 300 for routing a call using a hybrid call routing scheme. In one embodiment, one or more steps or operations of the method 300 may be performed by the application server 116 and/or a general-purpose computer as illustrated in FIG. 4 and discussed below.

The method 300 begins at step 302. At step 304, the method 300 receives a call for a customer agent at a call center. For example, a customer may attempt to reach a call center of a company to obtain customer service for a question, technical support, a complaint, an ordering issue, or any other number of a variety of reasons.

At step 306, the method 300 identifies a list of available customer agents. For example, the method 300 attempts to find the customer agents that are available to accept and service the incoming call. In other words, the method 300 does not include customer agents that are already engaged or in the process of servicing another call.

At step 308, the method 300 calculates a hybrid score for each one of the available customer agents, wherein the hybrid score is based upon a combination of a longest-idle-agent routing parameter, a performance based routing parameter and a tuning parameter. In one embodiment, the hybrid call routing scheme may be defined by the equation:

$$H_i = \mu P_i + (1-\mu)T_i, \qquad \text{Eq. (1):}$$

where $H_i$ is a hybrid score of an ith customer agent of the available customer agents, $P_i$ (e.g., a performance based routing parameter) is a performance based routing score of the ith customer agent of the available customer agents, $T_i$ (e.g., a longest-idle-agent routing parameter) is a waiting time of the ith customer agent of the available customer agents and $\mu$ is a tuning variable having a value between 0 to 1, wherein when a call waiting queue is empty $\mu=0$ and when the call waiting queue is at a maximum capacity $\mu=1$.

In one embodiment, the value of $\mu$ may be found by looking at a chart, e.g., chart 200 in FIG. 2, based upon a number of calls currently in a queue. In one embodiment, the performance based routing score $P_i$ may be calculated by any available performance based routing function. For example, any one of the equations (2)-(5) described above may be used to calculate the performance score $P_i$. It should be noted that equations (2)-(5) are only listed as examples and that the present disclosure is not limited to only those examples. Other types of equations, algorithms and methods for calculating a performance score may be used and are within the scope of the present disclosure.

At step 310, the method 300 selects a customer agent from the list of the available customer agents having a highest hybrid score. For example, after the hybrid score is calculated for each one of the available agents, the hybrid scores for each one of the available agents may be compared against one another. The agent having the highest hybrid score may be selected.

At step 312, the method 300 routes the call to the customer agent that is selected.

At step 314, the method 300 determines if a new call is received. If the method 300 receives a new call, the method 300 returns to step 306 and the method 300 repeats steps 306 to 314. For example, the value of $\mu$ is updated and a hybrid score is re-calculated for each remaining available agent.

However, if the method 300 determines that a new call is not received, the method 300 proceeds to step 316. At step 316, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for routing a call using a hybrid call routing scheme, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for routing a call using a hybrid call routing scheme can be loaded into memory 404 and executed by processor 402 to implement the functions as discussed above. As such, the present method 405 for routing a call using a hybrid call routing scheme (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for routing a call, comprising:
    receiving, by a processor, the call for a customer agent at a call center;
    identifying, by the processor, a list of available customer agents;
    calculating, by the processor, a hybrid score for each one of the available customer agents according to a function $H_i=\mu P_i+(1-\mu)T_i$, where $H_i$ is a hybrid score of an ith customer agent of the available customer agents, $P_i$ is a performance based routing score of the ith customer agent of the available customer agents, $T_i$ is a waiting time of the ith customer agent of the available customer agents that represents a longest-idle agent routing parameter and $\mu$ is a tuning parameter having a value between 0 to 1 that is selected based on a queue length;
    selecting, by the processor, a customer agent from the list of the available customer agents having a highest hybrid score; and
    routing, by the processor, the call to the customer agent that is selected.

2. The method of claim 1, wherein when the value of the tuning parameter is 1, the hybrid score is based on only the performance based routing score.

3. The method of claim 1, wherein when the value of the tuning parameter is 0, the hybrid score is based on only the longest-idle-agent routing parameter.

4. The method of claim 1, wherein the value of the tuning parameter is based upon a logarithmic relationship to the queue length.

5. The method of claim 1, wherein the value of the tuning parameter is based upon a linear relationship to the queue length.

6. The method of claim 1, wherein the tuning parameter is re-calculated each time a new call is received.

7. The method of claim 1, wherein the performance based routing score is a function of at least one of: an average call duration, an average call duration and quality grade parameter, an average number of calls handled per hour or an adjusted performance score.

8. A non-transitory computer-readable medium storing a plurality of instructions which, when executed by a processor, cause the processor to perform operations for routing a call, the operations comprising:
    receiving the call for a customer agent at a call center;
    identifying a list of available customer agents;
    calculating a hybrid score for each one of the available customer agents according to a function $H_i=\mu P_i+(1-\mu)T_i$, where is a hybrid score of an ith customer agent of the available customer agents, $P_i$ is a performance based routing score of the ith customer agent of the available customer agents, $T_i$ is a waiting time of the ith customer agent of the available customer agents that represents a longest-idle agent routing parameter and $\mu$ is a tuning parameter having a value between 0 to 1 that is selected based on a queue length;
    selecting a customer agent from the list of the available customer agents having a highest hybrid score; and
    routing the call to the customer agent that is selected.

9. The non-transitory computer-readable medium of claim 8, wherein when the value of the tuning parameter is 1, the hybrid score is based on only the performance based routing score.

10. The non-transitory computer-readable medium of claim 8, wherein when the value of the tuning parameter is 0, the hybrid score is based on only the longest-idle-agent routing parameter.

11. The non-transitory computer-readable medium of claim 8, wherein the value of the tuning parameter is based upon a logarithmic relationship to the queue length.

12. The non-transitory computer-readable medium of claim 8, wherein the value of the tuning parameter is based upon a linear relationship to the queue length.

13. The non-transitory computer-readable medium of claim 8, wherein the tuning parameter is re-calculated each time a new call is received.

14. The non-transitory computer-readable medium of claim 8, wherein the performance based routing score is a function of at least one of: an average call duration, an average call duration and quality grade parameter, an average number of calls handled per hour or an adjusted performance score.

* * * * *